US010620065B2

(12) United States Patent
Polsky et al.

(10) Patent No.: US 10,620,065 B2
(45) Date of Patent: Apr. 14, 2020

(54) CEMENT HAVING STRESS-INDICATING PROPERTIES (71) Applicant: UT Battelle, LLC, Oak Ridge, TN (US)

(72) Inventors: Yarom Polsky, Oak Ridge, TN (US); Michael J. Lance, Oak Ridge, TN (US); Catherine H. Mattus, Oak Ridge, TN (US); James G. Hemrick, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 141 days.

(21) Appl. No.: 15/807,950

(22) Filed: Nov. 9, 2017

(65) Prior Publication Data
US 2018/0156677 A1 Jun. 7, 2018

Related U.S. Application Data (63) Continuation-in-part of application No. 15/675,473, filed on Aug. 11, 2017, now Pat. No. 10,451,497.
(Continued)

(51) Int. Cl.
G01L 1/24 (2006.01)
C04B 28/04 (2006.01)
C09K 8/467 (2006.01)
E21B 47/00 (2012.01)
G01L 1/26 (2006.01)
C04B 7/32 (2006.01)
C04B 7/02 (2006.01)
G01J 3/02 (2006.01)
C09K 11/68 (2006.01)
(Continued)

(52) U.S. Cl.
CPC ............... *G01L 1/24* (2013.01); *C04B 28/04* (2013.01); *C09K 8/467* (2013.01); *E21B 47/0005* (2013.01); *G01L 1/241* (2013.01); *G01L 1/26* (2013.01); *C04B 7/02* (2013.01); *C04B 7/32* (2013.01); *C04B 2111/80* (2013.01); *C09K 11/685* (2013.01); *C09K 2103/00* (2013.01); *E21B 49/006* (2013.01); *G01J 3/0218* (2013.01)

(58) Field of Classification Search
CPC .. C09K 8/467; C09K 11/685; C09K 2103/00; E21B 47/0005; E21B 49/006; G01L 1/24; G01L 1/241; G01L 1/26
USPC .......................................................... 73/803
See application file for complete search history.

(56) References Cited

U.S. PATENT DOCUMENTS 3,778,388 A * 12/1973 Cornelius ............... B01J 23/26
502/320
4,055,509 A * 10/1977 Weimer ................... C01F 7/36
252/363.5
(Continued)

FOREIGN PATENT DOCUMENTS

CN 103896533 * 7/2014

Primary Examiner — Octavia Hollington
(74) Attorney, Agent, or Firm — Benesch, Friedlander, Coplan & Aronoff LLP (57) ABSTRACT A system and method measures subterranean stress. The system and method includes a cement mixture that is mixed with water to set as a solid and a stress measuring-medium having piezospectroscopic properties that directly reveals stress in situ within the cement mixture in response to a photo stimulation. The stress measuring-medium combines with the cement mixture as a dry blend before being combined with water.

18 Claims, 6 Drawing Sheets

Related U.S. Application Data

(60) Provisional application No. 62/428,569, filed on Dec. 1, 2016.

(51) Int. Cl.
  *C09K 103/00* (2006.01)
  *E21B 49/00* (2006.01)
  *C04B 111/80* (2006.01)

(56) References Cited

U.S. PATENT DOCUMENTS

| | | | | |
|---|---|---|---|---|
| 4,328,038 A | * | 5/1982 | Briggs | C04B 22/04 |
| | | | | 106/404 |
| 6,230,804 B1 | * | 5/2001 | Mueller | C04B 14/043 |
| | | | | 166/293 |
| 6,626,243 B1 | * | 9/2003 | Go Boncan | C04B 28/04 |
| | | | | 166/293 |
| 7,270,705 B2 | * | 9/2007 | Lin | A61L 24/001 |
| | | | | 106/690 |
| 8,105,433 B2 | * | 1/2012 | Kishi | C04B 28/02 |
| | | | | 106/672 |
| 8,951,604 B2 | * | 2/2015 | Hoffmann | C04B 24/2641 |
| | | | | 404/75 |
| 2013/0082191 A1 | * | 4/2013 | Raghavan | C09K 11/02 |
| | | | | 250/459.1 |
| 2018/0015198 A1 | * | 1/2018 | Ren | A61L 24/0052 |

* cited by examiner

CEMENT HAVING STRESS-INDICATING PROPERTIES

CROSS-REFERENCE TO RELATED APPLICATIONS

This application is a continuation-in-part of U.S. application Ser. No. 15/675,473, filed Aug. 11, 2017, entitled Stress Sensor for Cement or Fluid Applications, and further claims priority to U.S. Application Ser. No. 62/428,569, filed Dec. 1, 2016, entitled Cement Having Stress-Indicating Properties, the entirety of both which are incorporated by reference.

STATEMENT REGARDING FEDERALLY SPONSORED RESEARCH AND DEVELOPMENT

This invention was made with United States government support under Contract No. DE-AC05-000R22725 awarded by the United States Department of Energy. The United States government has certain rights in the invention.

BACKGROUND

1. Technical Field

This disclosure relates to measuring stress and more specifically to systems and processes that measure stress in a hardened cementitious materials.

2. Related Art

Concrete is a structural building material used in critical infrastructure around the world. When concrete fails, it can cause catastrophic results that isolate populations or expose them to hazards. In many instances, concrete fails because of its inability to support loads. Concrete's stress state is a measure of concrete's structural integrity especially when it is subject to changing loads.

DETAILED DESCRIPTION OF THE PREFERRED EMBODIMENTS

The integrity of a wellbore requires competence of the materials comprising the well (casing, cement and rock) as well as the bonding between them. Wellbore cement is an important component because it is the material that is primarily responsible for providing vertical isolation along the wellbore, while also protecting the casing from potentially damaging formation fluids. It is also a particularly vulnerable component in the well system because it is an engineered material that is mixed and then formed in a very poorly controlled environment. During the operational life of a well, the cement will experience a number of cyclic pressure and temperature loads associated with activities such as drilling, stimulation, injection and production. These loads deform the cement and can produce cracks or delamination that may ultimately result in a failure of the seal between zones or, in some rare cases, all the way to the surface.

A fundamental parameter associated with the failure of a material is its stress state. Not coincidentally, stress is also a primary parameter in the design and engineering of structural systems. Considering its critical role as a structural material, cement has relatively low tensile strength and ductility. This makes knowing its stress state important when it comes to both the design and monitoring of the well system. In spite of this importance, there have been neither experimental nor field measurements of the actual stress experienced by cement in operating conditions and, in fact, there are no commercially available sensors for monitoring the stress within cement.

Figure 1:
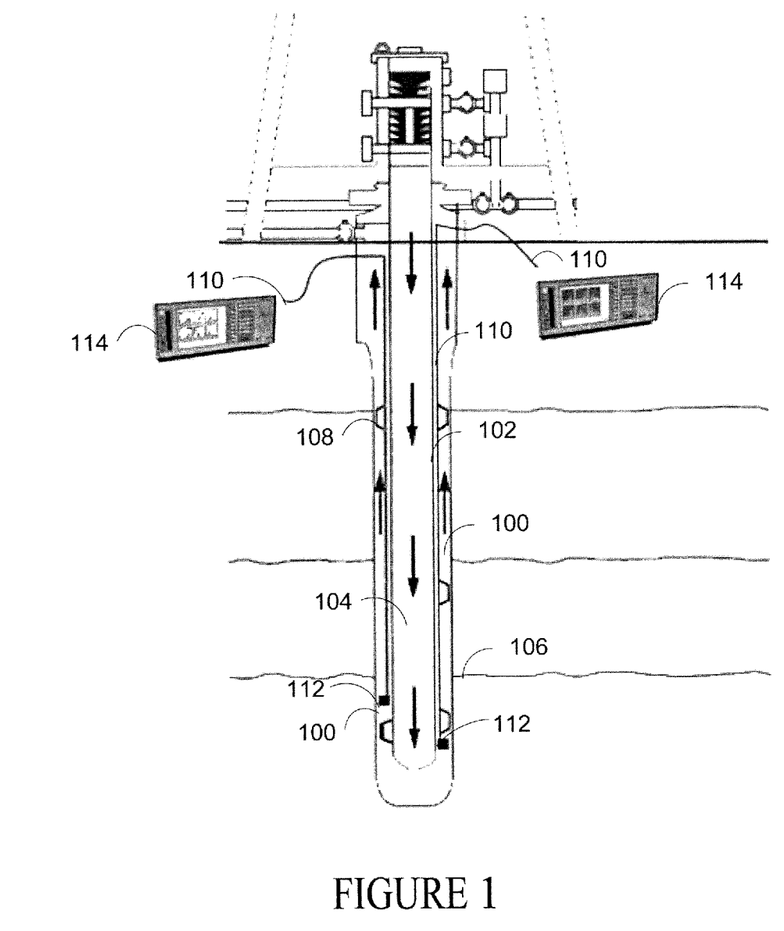
FIG. 1 is a cross-section of a wellbore with a plurality of in situ stress sensors.

In FIG. 1, hydrostatic stress is measured directly through a non-destructive system that transforms the primary cement (e.g., cement mixture that may be mixed with water to set as a solid material) that reinforces and seals a wellbore into an in situ stress gauge. The primary cement serves as a sheath within the annulus 100 between a tubular casing 102 (also referred to as the tubular or the tubular structure) and the rock formation 106. As shown by the arrows, primary cement is injected downward through the area 104 enclosed by the tubular casing 102 until it impinges at the bottom of the well or in the alternative, impinges a physical barrier such as an elastomeric plug that forces the cement up through the annulus 100 of the wellbore. In other systems, the material or primary cement is pumped directly through an upper opening of annulus 100 around the centralizers 108 that keep the tubular casing 102 in its proper placement and ensures a uniform sheath. The primary cement may be injected until the wellbore is partially or fully encased.

In FIG. 1, materials having piezospectroscopic properties are added to the primary cement before injection. The properties of the piezospectroscopic and/or elastic additive may be revealed through a photo stimulation that may include alpha-$Al_2O_3$ based materials. The piezospectroscopic effects are measured by one or more single-mode or a multi-mode fiber optics 110 (two fiber optic cables 110 shown in FIG. 1) that are embedded in the piezospectroscopic and/or elastic materials within the annulus 100 bounded by the tubular 102 and rock formation 106. In the single-mode or a multi-mode based system, the wavelength of the light transmitted through the fiber optics may lie in the absorption region of the photo-stimulated luminescence of the stress-sensing phase. When $Al_2O_3$ is used for example, a green or blue laser may be used. In some instances, any wavelength below the emission wavelength of about ~692 nm is used, such that the light is transmitted through the fiber optic 110 and mechanical coupling 112 that also receives the luminescence.

In operation, absorption region light is transmitted (by a source such as the laser that is not shown) through the fiber optic cable 110 embedded in the cement or concrete. Some of the incident laser light is absorbed by the alumina powder in the cement. The energy from the incident light non-radiatively de-excites down to 14400 and 14430 $cm^{-1}$, which are the two emission lines known as R-lines (referred to as $R_1$ and $R_2$ or the R-lines) because the emission occurs at 692 nm, in the red region of E-M spectrum. These peaks shift at about ~7.6 cm$^{-1}$/GPa of hydrostatic stress. Here, the effect of temperature at the mechanical coupling 112 is accounted and compensated for by measuring stress-free samples at the location or locations of interest and subtracting or adding the contribution representing the temperature contribution to the peak shift.

In FIG. 1 the piezospectroscopic and/or elastic materials, cement, and fiber optic cable serve as an in situ stress gauge or global mechanical integrity function of the cement or concrete. The piezospectroscopic and/or elastic materials provide pinpoint hydrostatic stress measurements (two such systems are shown in FIG. 1). It also serves as hydraulic seals that provide zone isolation. The piezospectroscopic and/or elastic materials, cement, and fiber optic cable provides zone isolation between the lateral rock formation 106 and the area 104 enclosed by the tubular 102 which further protects the tubular casing 102 against corrosion that would otherwise occur if fluid were to flow from the lateral rock formation 106 to the outer surface of the tubular 102.

In FIG. 1 the cement operation uses an Ordinary Portland Cement (OPC) that consists substantially of anhydrous calcium silicate and calcium aluminate compounds that hydrate with water; in alternate operations, a small addition of slightly expansive cement, calcium sulfoaluminate cement, is added to the OPC to reduce the shrinkage of the OPC resulting from hydration. The piezospectroscopic and/or elastic material additive and OPC has a relatively uniform grain structure and high elastic modulus. The former provides a uniform transfer of stress throughout the material while the latter provides a high elastic modulus of the piezospectroscopic and/or elastic materials (e.g., the stress-measuring medium).

The stress sensing characteristics of some stress-measuring mediums may be compliant with one or more characteristics. For example, when a blend of alpha-alumina ($\alpha$-Al$_2$O$_3$) comprises the stress-measuring medium, the polarized emission spectra (referred to as R$_1$ and R$_2$ or the R-lines) is preferably consistent to accurately measure stress variation within the stress-measuring medium when under load. Further, the cement (that is a blend of OPC and expansive admixture) is preferably slightly expanding while setting in order to maintain contact and measure the response of the load under pressure. Further, the intensity of the R-lines is preferably sufficient to receive the spectra with a high signal-to-noise ratio in a short time period, preferably, less than about one minute.

Figure 2:
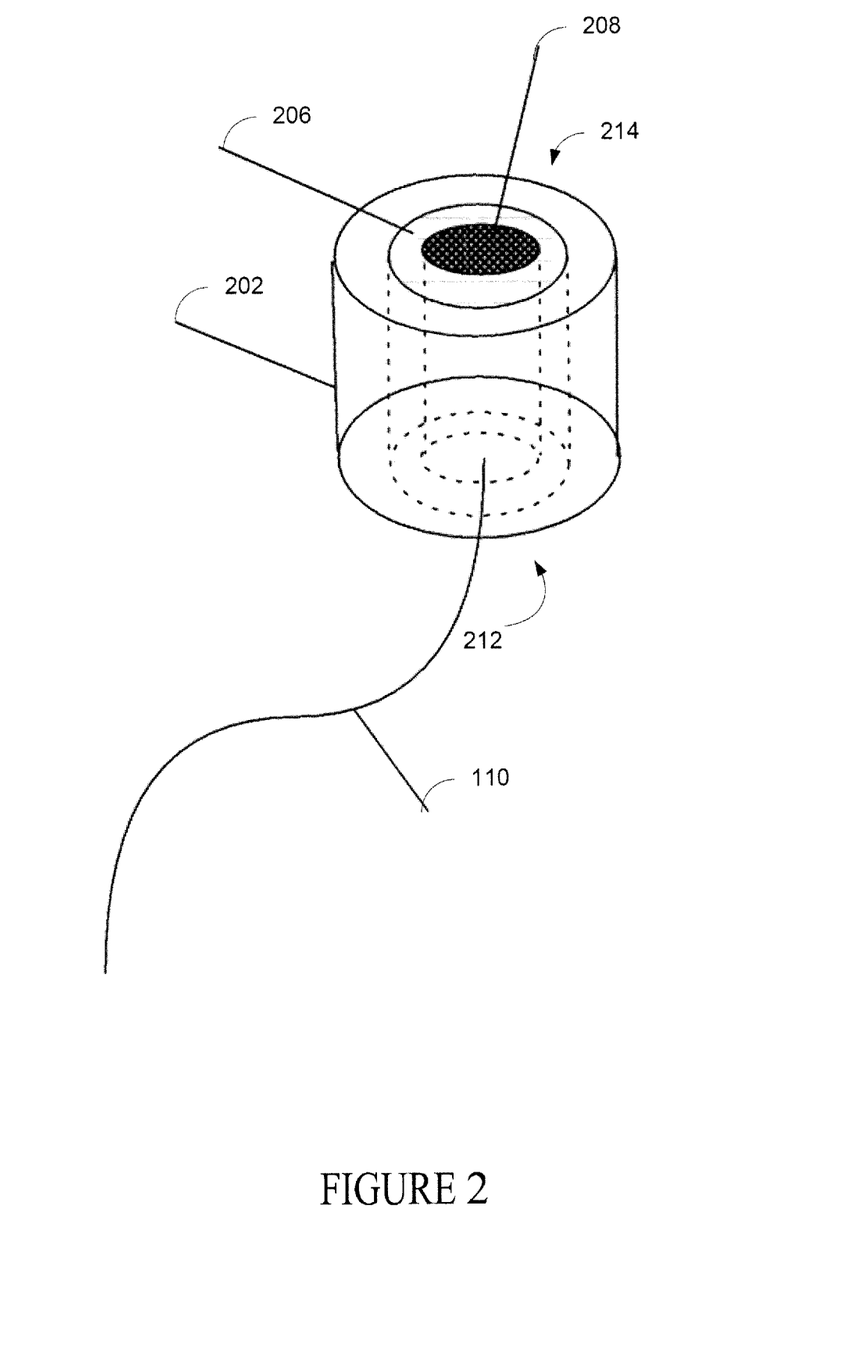
FIG. 2 is a cross-section of a directional stress sensor.
Figure 3:
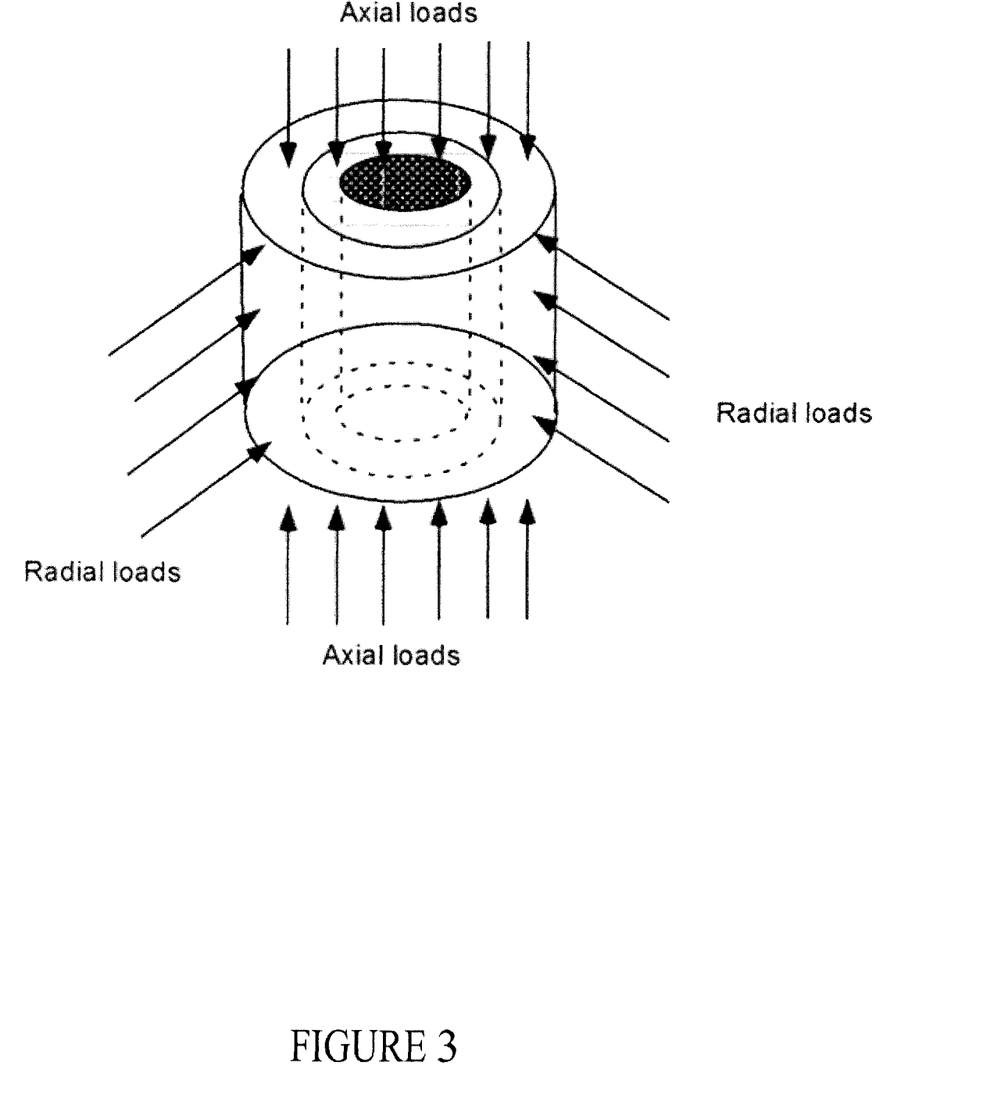
FIG. 3 is a partial cross-sectional view of a directional stress sensor under axial and radial loads.

FIG. 2 is a directional stress sensor that insulates the volume of the stress-measuring medium so that it experiences stress in only one direction. In FIG. 2, the stress measurement direction is an axial direction. The directional stress sensor may measure all normal (e.g., perpendicular) stress components that may be summed to derive a subterranean hydrostatic stress measurement. In FIGS. 2 and 3, a cylindrical sensor housing 202 is positioned such that it receives all the subterranean radial loads that would bias the directional stress sensor. A compliant material 206, such as an air gap and/or an elastomer material for example, may fill the uninterrupted annulus between the sensor housing 202 and the stress sensing material 208. In FIGS. 2 and 3, the compliant material 206 isolates the stress generated from the radial loads that bias the sensor housing 202 from the stress measuring material 208. In FIGS. 2 and 3, the stress measuring materials that fills the axial space of the stress sensor is in direct contact with the axial loads that the stress sensor is to measure. When stiffness matching of a stressed material is desired, the stress-measuring medium 208 may comprise piezospectroscopic and/or elastic materials, cement, an alpha-alumina, or one or more alternative material doped with appropriate amounts of alpha-alumina. Compliant material 206 encases the stress-measuring materials 208 housed within the cylindrical housing 202. The compliant material lies within the annulus that separates the stress-measuring medium 208 and the sensor housing 208.

The directional stress sensor of FIGS. 2 and 3 may measure subterranean stress in a fluid or hardened medium. While the entire sensor housing 202 may be subject to the stresses transferred through the fluid surrounding medium, only the stresses received in the axial direction act on the stress material. In FIGS. 2 and 3, some or all of the one or more single-mode or multi-mode fiber optic cables 110 (one fiber optic cable 110 is shown in FIGS. 2 and 3, respectively) is embedded in the stress-measuring medium 208 bounded by the compliant material 206. In FIGS. 2 and 3, the proximal 214 and/or distal 212 end of the sensor housing 202 may be open to ensure direct contact with some or all of targeted area under measure. The directional stress sensor may be placed in any angular position to measure axial loads in any direction to suit a particular application.

In operation, absorption region light is transmitted (by a source such as a laser that is not shown) through the fiber optic cable 110 embedded in the stress-measuring medium 208.

For an isotropic polycrystalline $\alpha$-Al$_2$O$_3$, the shift in a wavenumber is related to the hydrostatic stress by the expression below, where $\Delta V$ is the wavenumber change and $$\Delta V = \Pi_{ii} \sigma_h \qquad \text{EQ. 1}$$

$\Pi_{i\ i}$ is the piezospectroscopic (PS) coefficient, given in units of cm$^{-1}$/GPa. The PS coefficient of polycrystalline alumina is 2.46 cm$^{-1}$/GPa for the R1 line and 2.50 cm-1/GPa for the R2 line in tension and compression loading tests. In other implementations, the PS coefficient for alumina-epoxy nanocomposites is between 3.16 cm$^{-1}$/GPa and 5.63 cm$^{-1}$/GPa for the R1 line and between 2.6 cm$^{-1}$/GPa and 5.08 cm$^{-1}$/GPa for the R2 line when the volume fraction of alumina varies between about 5% and 38%.

To meet a desired spectral resolution, such as about 0.01 cm$^{-1}$ at about 14430 cm$^{-1}$ (which corresponds to 1.3 MPa hydrostatic stress for a PS coefficient of 7.62 cm$^{-1}$/GPa, the PS coefficient for the R2-line of polycrystalline alumina), for example, some systems maintain the signal variability of the alumina powders to be less than or close to the desired spectral resolution metric.

To meet performance criterion, stress sensing-cement may be prepared by combining OPC, an expansive mineral additive, such as a calcium sulfoaluminate cement (e.g., a calcium sulfoaluminate cement), a water-reducing admixture, such as MasterGlenium 7700, and an isotropic polycrystalline $\alpha$-Al$_2$O$_3$ at the weight functions summarized in Table 1 below. The expansive mineral additive is added to the OPC at the level of about 15% to counteract the shrinkage of the combination during curing. The dry blend components—the OPC, the expansive materials, and the alumina may be mixed in a V-type blender. The grout preparation may be made by mixing the water and water reducer followed by addition of increasing amounts of dry blend and mixing well after each addition.

TABLE 1 exemplary blend.

| | Wt (g) | Wt % of dry blend weight | Wt % of total weight |
|---|---|---|---|
| Type I/II OPC | 382.5 | 54.6 | 43.5 |
| Komponent | 67.5 | 9.6 | 7.7 |
| Alumina A2 | 250 | 35.7 | 28.4 |
| Water | 175 | — | 19.9 |
| Glenium 7700 | 5.3 | — | 0.6 |
| Dry blend | 700 | 100.0 | 79.5 |
| Cement paste | 880.3 | — | 100.0 |
| Water/Cement | | | 40% |
| Water/Solid | | | 26% |
| Alumina BWOC (by weight of cement) | | 55.60% | |

An alternate stress sensing-cement may be prepared by combining a Class H oil well cement with, an expansive mineral additive, a water-reducing admixture, and an isotropic polycrystalline α-Al$_2$O$_3$ with a particle size of about 80 nm at weight functions summarized in Table 2 below. The dry blend components—the class H cement, the expansive mineral additive, and alumina may be combined through a V-blender. The grout may be prepared by first mixing the water and water reducer. The API specification 10A may be followed for the preparation of the slurries using a one-quart size, bottom-drive, blade-type mixer. The dry blend may be added progressively and mixed in a commercial high shear mixer. The high shear mixer may fluidify the grout before dry blend additions. At the end of the dry blend additions, the grout may be mixed for about 30-45 seconds via a high-speed mixer.

TABLE 2 an alternate exemplary blend.

| | Wt (g) | Wt % of dry blend weight | Wt % of total grout weight |
|---|---|---|---|
| Type H oilwell cement | 382.29 | 54.7 | 42.1 |
| Komponent | 65.93 | 9.4 | 7.3 |
| Alumina 80 nm | 250.12 | 35.8 | 27.6 |
| Water | 202.37 | | 22.3 |
| Glenium 7700 | 6.45 | | 0.7 |
| Dry blend | 698.34 | 100.0 | 77.0 |
| Cement paste | 907.16 | | 100.0 |
| Water/Cement | | | 47% |
| Water/Solid | | | 30% |
| Alumina BWOC (by weight of cement) | | 55.80% | |

Figure 4:
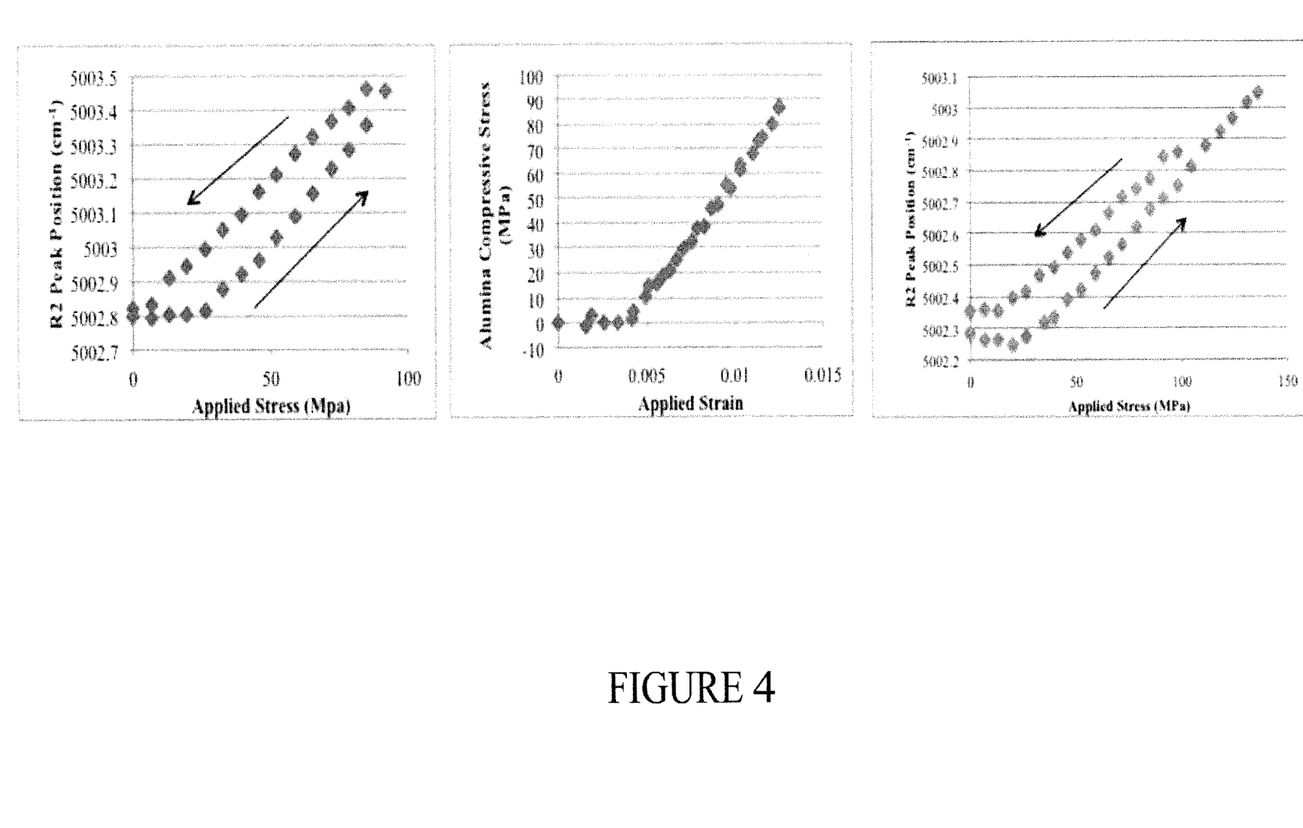
FIG. 4 shows a peak shift versus an applied load for two American Petroleum Institute (API) Class H cement samples with about 33.3% Vol. % of an 80 nm alumina.

FIG. 4 shows some of the stress sensing ability of the alternate exemplary blend subject to uniaxial compression tests that characterize the piezospectroscopic response as a function of loading. The arrows indicate the loading and unloading directions and the middle plot shows the stress versus strain for the second sample shown on the left of FIG. 4. The loading curves for the samples show that the transfer of load from the cement to the alumina occurred at the yield point of the cement. Both samples displayed softening between 30 MPa and 40 MPa as shown by drops in the load cell value when the displacement was suspended for measurements. The unloading curves show an improvement of the transfer of the load between the cement and the alumina at the lower stress levels with the samples on the far left and far right exhibiting a linear response down to approximately 6 MPa and 13 MPa, respectively.

Figure 5:
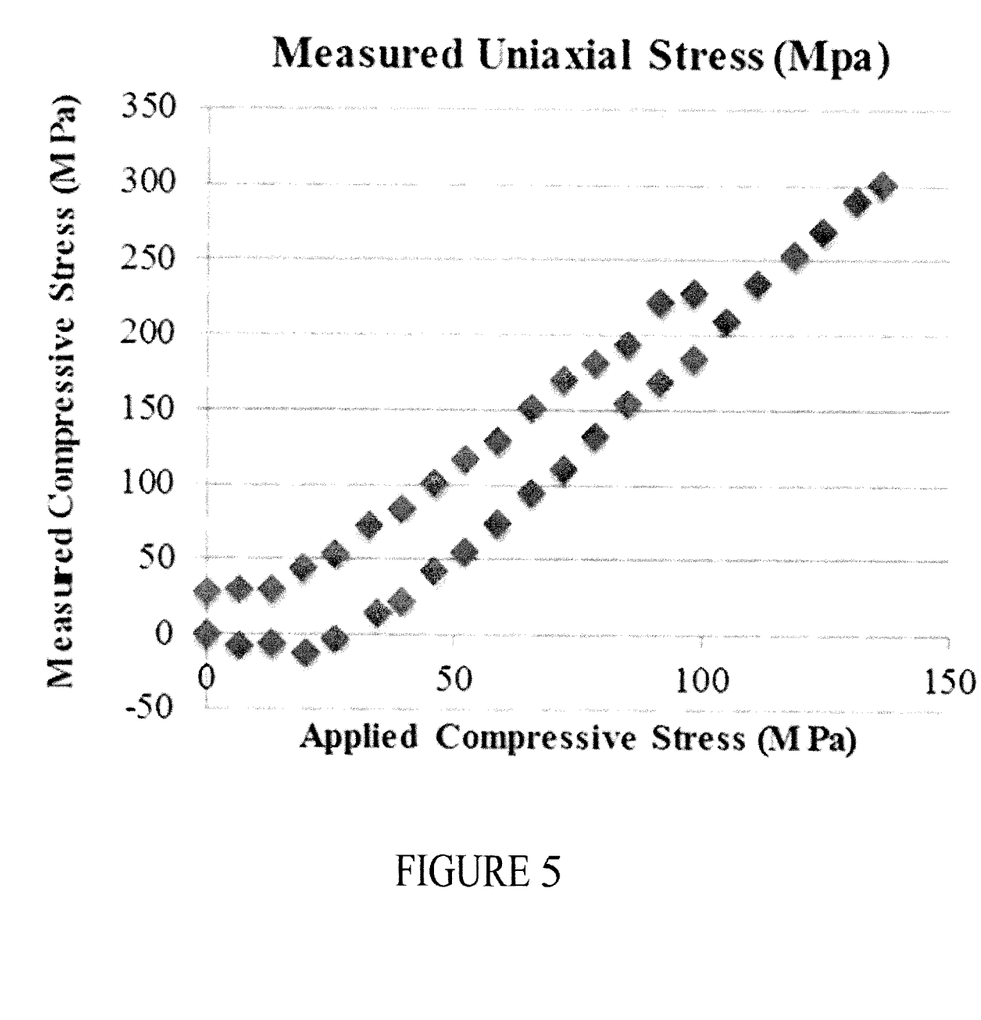
FIG. 5 shows a relationship between an applied stress and a measured compressive stress.

FIG. 5 shows a relationship between an applied stress and a measured compressive stress. Since cement has a much lower elastic modulus than α-Al$_2$O$_3$, a person of ordinary skill may expect that the stress applied to the cement would not transfer well to the alumina and the effective peak shift with stress would be lower than that of pure dense Al$_2$O$_3$. FIG. 5 shows that the stress not only transferring well from the cement to the Al$_2$O$_3$ but the measured stress in the Al2O3 is larger than the applied stress. These results provide preliminary indication that the alumina response provides a good measure of the stress response of the bulk material.

In use as a strain gauge, several directional stress sensors may be arranged to measure strain at zero degrees, forty-five degrees, ninety degrees, etc. to render an entire stress tensor σ within a subterranean plane. The directional stress sensors may completely define the stress state at a point inside a material in the deformed state, placement, or configuration. In other words, it may define the tensor's nine components $\sigma_{ij}$.

Figure 6:
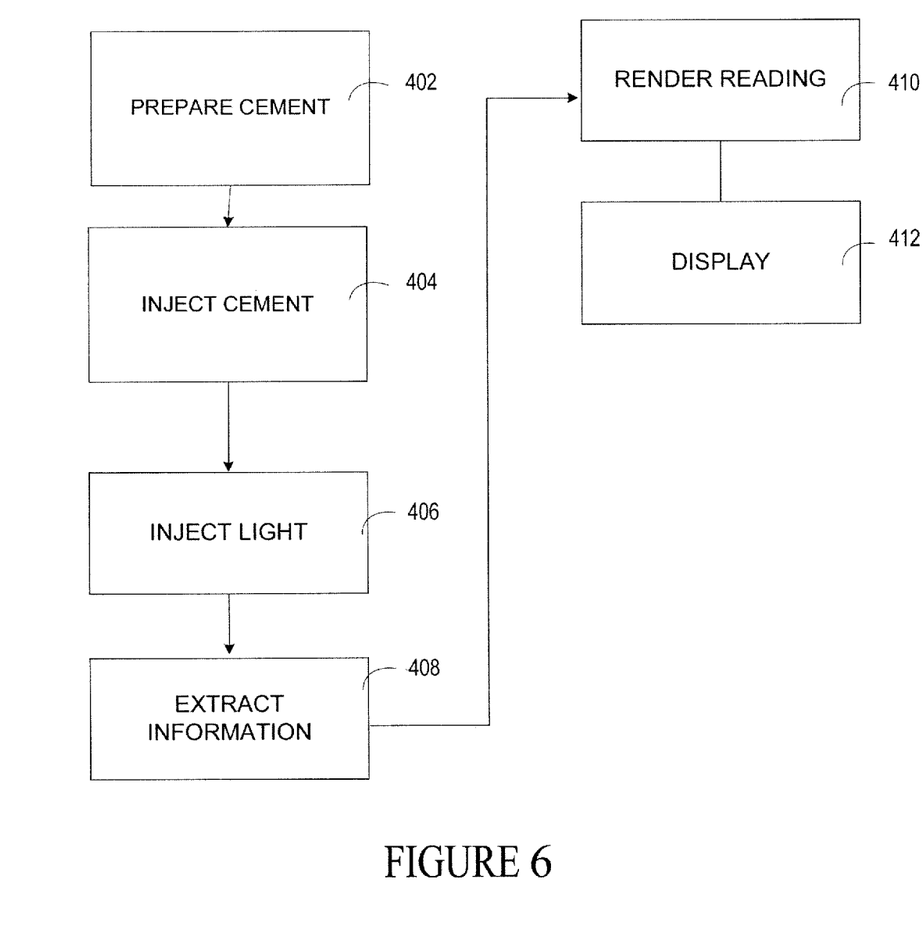
FIG. 6 is process that directly measures mechanical stress in situ.

FIG. 6 is a process that measures the mechanical integrity of a cement structure. The process may be implemented using the systems described in FIG. 1. In FIG. 6, hydrostatic stress is directly measured through the non-destructive process that transforms the primary cement that insulates the wellbore into a situ subterranean stress gauge, optical transducer, and hydrostatic seal. The primary cement serves as a sheath within the annulus 100 between a tubular casing 102 and the rock formation 106. Materials having piezospectroscopic and/or elastic properties are added to the primary cement before injection within the annulus 100 at 402. The properties of the piezospectroscopic and/or elastic additive may be revealed through a photo stimulation may include alpha-Al$_2$O$_3$ based materials that in some applications may include chromia. The luminescence is measured by one or more single-mode or a multi-mode fiber optic cable 110 (two fiber optic cables 110 were shown in FIG. 1) that are embedded in the piezospectroscopic and/or elastic materials within the annulus 100 bounded by the tubular casing 102 and rock formation 106. During exploration, cement is injected downward through the area 104 enclosed by the tubular casing 102 until it impinges the bottom or in the alternative impinges a physical barrier such as an elastomeric plug that forces the cement up through the annulus 100 of the wellbore at 404. In other systems, the material or cement is pumped directly through an upper opening of annulus 100 around the centralizers 108 that keeps the tubular casing 102 in its proper placement and helps ensure a uniform sheath. The primary cement may be injected until the wellbore is partially or fully encased.

In operation, absorption region light is transmitted (by the laser source that is not shown) through the fiber optic cable 110 embedded in the cement or concrete at 406. Here, the effect of temperature at the mechanical coupling point 112 is compensated for by measuring stress free samples at the location or locations of interest and subtracting or adding the contribution representing the temperature contribution to the optical measure.

While each of the disclosed systems and processes shown in FIGS. 1-6 may stand alone they also may be combined and interface other systems and applications. Other alternate systems and processes may include any combinations of structure and functions described above or shown in one or more or each of the figures and may be part of or used with any infrastructure (e.g., bridges, buildings, roads, railways, tunnels, airports, rapid transit facilities, foundations, dams, coastlines, river embankments, seawalls, docks, canals, sewers, etc.,), any structure that uses cement-based composites, or any application measuring stress. These systems or methods are formed from any combination of structure and function described. Further, the piezospectroscopic and/or elastic material additive and cement and/or stress measuring medium 208 may include chromia. In this alternative system and process, chromia dopes the alumina. By heating the alumina for approximately two hours at about 1000° C. adjacent to chromia, the chromia sublimes and diffuses into the alumina substituting Cr for Al in the crystalline structure of the alumina. This combination increases the signal intensity of the solving power (e.g., the R-line intensity, which is the transition wavenumber, wavelength or frequency, divided by the resolution) from the alumina by almost 140 times. Further, this alternative system and process renders compositions with reduced alumina content, greater signal responses, and more consistent signal resolution. This in turn improves stress measurement especially at a target stress measurement resolutions of less than about one MPa. Improving the predictability of the piezo spectroscopic response of the cement and additive or stress-measuring medium allows the systems and methods to obtain absolute measures of stress as opposed to relative changes after cement is curing and set. In addition, these systems increases the speed at which stress measurements may be taken increasing the resolution of stress data generated by cement health monitoring systems, and brings the mechanical and fluid properties of the cement and uncured cement closer to current field values.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The term "substantially" or "about" encompass a range that is largely (ninety five percent or more), but not necessarily wholly, that which is specified. It encompasses all but a significant amount. When operations are responsive to or occur in response to the actions and/or steps of other operations that are occurring, those subsequent operations necessarily occur as a direct or indirect result of the preceding operation. In other words, the operations occur as a result of the preceding operations. An operation that is responsive to another operation requires more than an action (i.e., the operation's response to) merely follow the prior operation.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A stress sensor system that measures subterranean stress in situ comprising:
   a cement mixture that is mixed with water to set as a solid material; and
   a stress measuring-medium having piezospectroscopic properties that directly reveals stress in situ within the cement mixture in response to a photo stimulation by measuring an absorption of an incident light non-radiatively de-excited to about 14400 $cm^{-1}$;
   where the stress measuring-medium is combined with the cement mixture and water.

2. The system of claim 1 further comprising an expansive mineral additive combined with the stress measuring-medium.

3. The system of claim 2 further comprising a water-reducing admixture combined with the stress measuring-medium.

4. The system of claim 1 where the stress measuring-medium comprises an alpha-alumina material.

5. The system of claim 1 where the stress measuring-medium comprises an alpha-alumina material and a chromia material.

6. The system of claim 1 where the cement mixture comprises a Portland cement that forms a hydraulic seal with an alpha-alumina material.

7. The system of claim 1 where the cement mixture comprises a calcium sulfoaluminate cement added to a class H cement that forms a hydraulic seal with a alpha-alumina material.

8. A stress sensor that measures subterranean stress in situ comprising:
   a cement mixture that is mixed with water to set as a solid material; and
   a stress measuring-medium having piezospectroscopic properties that directly reveals stress in situ within the cement mixture in response to a photo stimulation;
   where the stress measuring-medium is combined with the cement mixture and water; and
   where the stress sensor renders a spectral resolution of 0.01 $cm^{-1}$ at about 1443 $cm^{-1}$.

9. A method for measuring subterranean stress in situ comprising:
   mixing a water reducing admixture with water to render a mixture;
   dry blending a cement mixture, an expansive mineral additive, and a stress measuring-medium in a dry blend; and
   mixing progressively the dry blend to obtain a homogeneous cement slurry; and
   where the stress measuring medium comprises about a fifty-five percent dry blend by weight of a total weight of the cement mixture;
   where the stress measuring medium renders a spectral resolution of about 0.01 $cm^{-1}$ at about 1443 $cm^{-1}$.

10. The method of claim 9 where the stress measuring-medium comprises an alpha-alumina material.

11. The method of claim 9 where the stress measuring-medium comprises an alpha-alumina material and a chromia material.

12. The method of claim 9 where the cement mixture comprises a Portland cement that forms a hydraulic seal with an alpha-alumina material.

13. The method of claim 9 where the cement mixture comprises a calcium sulfoaluminate cement added to a class H cement that forms a hydraulic seal with an alpha-alumina material.

14. The method of claim 9 where the stress measuring medium comprises a processed alumina heated up and until 950° C.

15. A stress sensor system that measures subterranean stress in situ comprising:
   a cement mixture that is mixed with water to set as a solid material; and
   an alpha-alumina compound having piezospectroscopic properties that directly reveals stress in situ within the cement mixture in response to a photo stimulation;
   where the alpha-alumina compound is combined with the cement mixture; and
   where the stress sensor renders a spectral resolution between 0.0095 $cm^{-1}$ and 0.01 $cm^{-1}$ at between 14400 $cm^{-1}$ and 1443 $cm^{-1}$.

16. The system of claim 15 further comprising an expansive mineral additive combined with the alpha-alumina compound.

17. The system of claim 16 further comprising a water-reducing admixture combined with the alpha-alumina compound.

18. The system of claim 15 where the alpha-alumina compound comprises an alpha-alumina material and a chromia material.

* * * * *